US012254890B2

(12) United States Patent
Kaneko et al.

(10) Patent No.: US 12,254,890 B2
(45) Date of Patent: Mar. 18, 2025

(54) AUDIO SIGNAL CONVERSION MODEL LEARNING APPARATUS, AUDIO SIGNAL CONVERSION APPARATUS, AUDIO SIGNAL CONVERSION MODEL LEARNING METHOD AND PROGRAM

(71) Applicant: NIPPON TELEGRAPH AND TELEPHONE CORPORATION, Tokyo (JP)

(72) Inventors: Takuhiro Kaneko, Musashino (JP); Hirokazu Kameoka, Musashino (JP); Ko Tanaka, Musashino (JP); Nobukatsu Hojo, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 251 days.

(21) Appl. No.: 18/017,800

(22) PCT Filed: Jul. 27, 2020

(86) PCT No.: PCT/JP2020/028717
§ 371 (c)(1),
(2) Date: Jan. 24, 2023

(87) PCT Pub. No.: WO2022/024183
PCT Pub. Date: Feb. 3, 2022

(65) Prior Publication Data

US 2023/0274751 A1 Aug. 31, 2023

(51) Int. Cl.
*G10L 21/00* (2013.01)

(52) U.S. Cl.
CPC .................................... *G10L 21/00* (2013.01)

(58) Field of Classification Search
CPC ...................................................... G10L 21/00
See application file for complete search history.

(56) References Cited

U.S. PATENT DOCUMENTS

2018/0342256 A1* 11/2018 Huffman ................. G10L 15/02
2019/0051314 A1* 2/2019 Nakashika ............ G10L 21/003
(Continued)

OTHER PUBLICATIONS

Lee, Shindong, et al. "Many-to-many voice conversion using conditional cycle-consistent adversarial networks." ICASSP 2020-2020 IEEE International Conference on Acoustics, Speech and Signal Processing (ICASSP). IEEE, 2020. (Year: 2020).*
(Continued)

*Primary Examiner* — Brian L Albertalli

(57) ABSTRACT

A voice signal conversion model learning device includes: a generation unit configured to execute generation processing of generating a conversion destination voice signal on the basis of an input voice signal that is a voice signal of an input voice, conversion source attribute information that is information indicating an attribute of an input voice that is a voice represented by the input voice signal, and conversion destination attribute information indicating an attribute of a voice represented by the conversion destination voice signal that is a voice signal of a conversion destination of the input voice signal; and an identification unit configured to execute voice estimation processing of estimating whether or not a voice signal that is a processing target is a voice signal representing a vocal sound actually uttered by a person on the basis of the conversion source attribute information and the conversion destination attribute intonation, wherein the conversion destination voice signal is input to the identification unit, the processing target is a voice signal input to the identification unit, and the generation unit and the identification unit pertain learning on the basis of an estimation result of the voice estimation processing.

7 Claims, 12 Drawing Sheets

(56) References Cited

U.S. PATENT DOCUMENTS

| | | | | |
|---|---|---|---|---|
| 2020/0365166 | A1* | 11/2020 | Zhang | G10L 19/00 |
| 2021/0193159 | A1* | 6/2021 | Pearson | G10L 21/0364 |
| 2021/0280165 | A1* | 9/2021 | Yu | G10L 13/047 |
| 2022/0122591 | A1* | 4/2022 | Kameoka | G10L 15/22 |
| 2024/0028843 | A1* | 1/2024 | Yerli | G10L 21/003 |

OTHER PUBLICATIONS

Chou, Ju-chieh, et al. "Multi-target voice conversion without parallel data by adversarially learning disentangled audio representations." arXiv preprint arXiv:1804.02812 (2018). (Year: 2018).*

Hirokazu Kameoka et al., "Stargan-VC: Non-Parallel Many-To-Many Voice Conversion With Star Generative Adversarial Networks", arXiv:1806.02169v2, 2018.

Takuhiro Kaneko et al., "StarGAN-VC2: Rethinking Conditional Methods for StarGAN-Based Voice Conversion", arXiv:1907.12279v2, 2019.

* cited by examiner

FIG. 14

| Objective | MCD [dB] | MSD [dB] |
|---|---|---|
| $\mathcal{L}_{cls}$ | 7.73 ± .07 | 1.96 ± .03 |
| $\mathcal{L}_{t\text{-}adv}$ | 7.21 ± .16 | 2.87 ± .51 |
| $\mathcal{L}_{t\text{-}adv} + \mathcal{L}_{cls}$ (StarGAN-VC) | 7.11 ± .10 | 2.41 ± .13 |
| $\mathcal{L}_{st\text{-}adv}$ (StarGAN-VC2) | **6.90 ± .07** | **1.89 ± .03** |

FIG. 15

| $G$ network | MCD [dB] | MSD [dB] |
|---|---|---|
| Channel-wise (StarGAN-VC) | 6.90 ± .08 | 2.55 ± .20 |
| Modulation-based (StarGAN-VC2) | 6.90 ± .07 | **1.89 ± .03** |

AUDIO SIGNAL CONVERSION MODEL LEARNING APPARATUS, AUDIO SIGNAL CONVERSION APPARATUS, AUDIO SIGNAL CONVERSION MODEL LEARNING METHOD AND PROGRAM

CROSS-REFERENCE TO RELATED APPLICATIONS

This application is a 371 U.S. National Phase of International Application No. PCT/JP2020/028717, filed on Jul. 27, 2020. The entire disclosure of the above application is incorporated herein by reference.

TECHNICAL FIELD

The present invention relates to a voice signal conversion model learning device, a voice signal conversion device, a voice signal conversion model learning method, and a program.

BACKGROUND ART

A technology of converting only a non-language/paralanguage (such as speaker characteristics and an utterance style) while maintaining the language information (uttered sentences) of input vocal sound is referred to as voice quality conversion, and is expected to be able to be applied to speaker characteristics conversion, speech support, speech enhancement, pronunciation conversion, and the like in text-to-speech synthesis. As one of sound quality conversion technologies, for example, a technology using machine learning has been proposed. As one of technologies using such machine learning, a technology using a system or a device including a generator and a discriminator such as an adversarial generation network, which are updated by learning, wherein information representing a conversion destination is introduced into the generator and the discriminator has been proposed. Further, a technology of using a system or a device including a generator and a discriminator, which are updated by learning, and imposing constraints such that a conversion result belongs to attributes of a target has been proposed.

CITATION LIST

Non Patent Literature

[NPL 1] Hirokazu Kameoka, Takuhiro Kaneko, Kou Tanaka, Nobukatsu Hojo, "STARGAN-VC:NON-PARALLEL MANY-TO-MANY VOICE CONVERSION WITH START GENERATIVE ADVERSARIAL NETWORKS," arXiv: 1806.02169v2

SUMMARY OF INVENTION

Technical Problem

However, in the above-described prior art, when there are many candidates for both an attribute of a conversion source and an attribute of a conversion destination, there is a case where voice conversion cannot be performed appropriately. For example, in the case of converting a male voice into a female voice, since the vocal sound is converted centering on a higher-pitched sound range where a difference from a male is made clearly apparent, and thus deviation to a higher pitched sound range than a normal sound range of a female that is a target may thus occur. In the case of many-to-many conversion, for example, it is necessary to simultaneously learn conversions different in conversion difficulty, such as conversion from a female voice to a female voice and conversion from a female voice to a male voice. In such a case, it may be impossible to uniformly learn all combinations. As a result, an experience distribution of results of conversion by a model of learning results may deviate from an experience distribution of learning data. Meanwhile, an experience distribution means a probability distribution in which a feature amount of data is defined as a probability variable.

In view of the above-mentioned circumstances, the present invention is intended to provide a technology for allowing voice conversion having a more appropriate experience distribution even when there are many candidates for both an attribute of a conversion source and an attribute of a conversion destination.

Solution to Problem

One aspect of the present invention is a voice signal conversion model learning device including: a generation unit configured to execute generation processing of generating a conversion destination voice signal on the basis of an input voice signal that is a voice signal of an input voice, conversion source attribute information that is information indicating an attribute of an input voice that is a voice represented by the input voice signal, and conversion destination attribute information indicating an attribute of a voice represented by the conversion destination voice signal that is a voice signal of a conversion destination of the input voice signal; and an identification unit configured to execute voice estimation processing of estimating whether or not a voice signal that is a processing target is a voice signal representing a vocal sound actually uttered by a person on the basis of the conversion source attribute information and the conversion destination attribute information, wherein the conversion destination voice signal is input to the identification unit, the processing target is a voice signal input to the identification unit, and the generation unit and the identification unit perform learning on the basis of an estimation result of the voice estimation processing.

Advantageous Effects of Invention

According to the present invention, it is possible to provide a technology for allowing voice conversion having a more appropriate experience distribution even when there are many candidates for both an attribute of a conversion source and an attribute of a conversion destination.

BRIEF DESCRIPTION OF DRAWINGS

FIG. 14 is a diagram of results of an experiment showing differences in MCD and differences in MSD due to differences in objective functions.

FIG. 15 is a diagram of results of an experiment showing differences in MCD and differences in MSD due to differences in the functional configuration of the generation unit 110.

DESCRIPTION OF EMBODIMENTS

Embodiment

Figure 1:
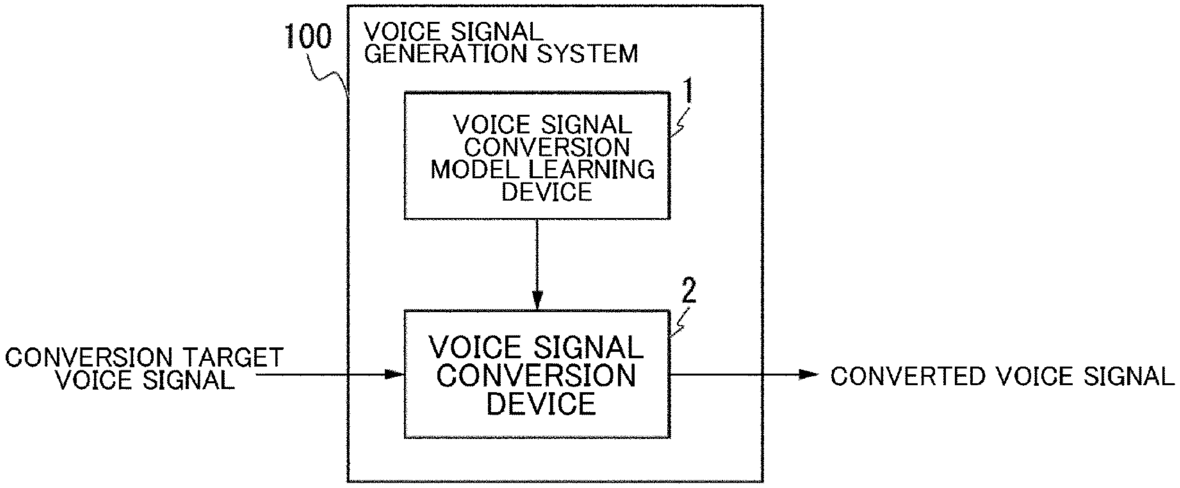
FIG. 1 is an explanatory diagram illustrating an overview of a voice signal generation system 100 of an embodiment.

An overview of a voice signal generation system 100 according to an embodiment will be described using FIG. 1 and FIG. 2. FIG. 1 is an explanatory diagram illustrating an overview of a voice signal generation system 100 of the embodiment. The voice signal generation system 100 converts a voice signal (hereinafter referred to as a "conversion target voice signal") representing a vocal sound (hereinafter referred to as "first speaker voice) uttered by a first speaker (hereinafter referred to as a "first speaker") into a converted voice signal. The converted voice signal is a voice signal representing a voice having acoustic features of a vocal sound uttered by a second speaker rather than acoustic features of the vocal sound uttered by the first speaker while having the same content as the conversion target voice signal. The second speaker is a speaker designated in advance by a user or the like to the voice signal generation system 100 as a speaker of the voice represented by the converted voice signal.

The voice signal generation system 100 includes a voice signal conversion model learning device (audio signal conversion model learning apparatus) 1 and a voice signal conversion device (audio signal conversion apparatus) 2. the voice signal conversion model learning device 1 updates a model of machine learning for converting a conversion target voice signal into a converted voice signal (hereinafter referred to as a "voice signal conversion model") by machine learning until predetermined termination conditions are satisfied.

Hereinafter, machine learning is called learning for simplicity of description. In addition, updating a model of machine learning (hereinafter referred to as "machine learning model") by machine learning means suitably adjusting parameter values in the machine learning model. The team "for learning" means use for updating the machine learning model. In the following description, learning to be A means that parameter values in the machine learning model are adjusted to satisfy A. A represents a condition.

Figure 2:
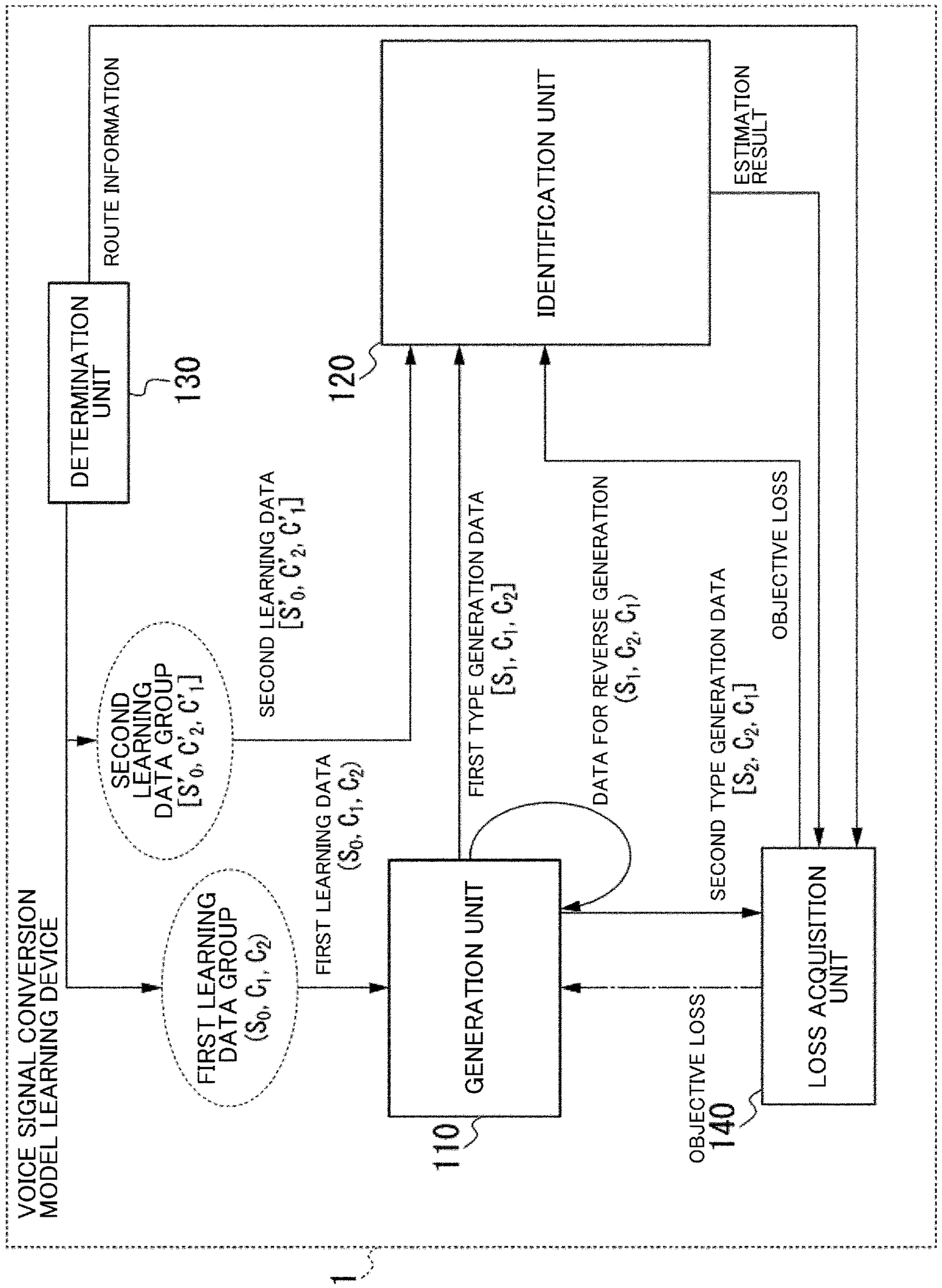
FIG. 2 is an explanatory diagram illustrating an overview of a voice signal conversion model learning device 1 in the embodiment.

FIG. 2 is an explanatory diagram illustrating an overview of the voice signal conversion model learning device 1 according to the embodiment. The voice signal conversion model learning device 1 updates the voice signal conversion model by performing learning using first learning data and second learning data. When the first learning data and the second learning data are not distinguished from each other, they are referred to as learning data.

The first learning data is data having a voice signal, conversion source speaker information, and conversion destination speaker information. The conversion source speaker information represents a speaker of a voice (hereinafter referred to as a "first learning voice") represented by a voice signal (hereinafter referred to as a "first learning voice signal") represented by the first learning data. The conversion destination speaker information represents a speaker set in advance as a speaker of a voice (hereinafter referred to as "a first type generation voice") represented by a voice signal (hereinafter referred to as a "first type generated signal") of a conversion destination by the voice signal conversion model of the first learning voice signal. The setting is performed by a user, for example. The speaker indicated by the conversion source speaker information and the speaker indicated by the conversion destination speaker information may be the same or different. Hereinafter, for simplicity of description, the first learning data in which the first learning voice signal is $S_0$, the speaker indicated by the conversion source speaker intonation is $C_1$, and the speaker indicated by the conversion destination speaker information is $C_2$ is represented by ($S_0$, $C_1$, $C_2$). Meanwhile, a symbol (A1, A2, A3) represents that information of a set of information A1, information A2, and information A3 is input to a generation unit 110 which will be described later.

The second learning data includes a voice signal, random speaker information, and speaker identification information. The speaker identification information represents a speaker set in advance as a speaker of a voice (hereinafter referred to as a "second learning voice") represented by a voice signal (hereinafter referred to as a "a second learning voice signal") represented by the second learning data. The random speaker information is information indicating a speaker randomly determined by a determination unit 130, which will be described later, among a plurality of speakers prepared in advance. Random determination is performed using a technique for generating random numbers such as a random number generator. Hereinafter, for simplicity of description, the second learning data in which the second learning voice signal is $S'_0$, the speaker indicated by the random speaker information is $C'_2$, and the speaker indicated by the speaker identification information is $C'_1$ is represented by ($S'_0$, $C'_2$, $C'_1$). Meanwhile, a symbol (A1, A2, A3) represents that information of a set of information A1, information A2, and information A3 is input to an identification unit 120 or a loss acquisition unit 140 which will be described later.

The voice signal conversion model learning device 1 includes the generation unit 110, the identification unit 120, the determination unit 130, and the loss acquisition unit 140. The generation unit 110 acquires the first learning data and executes first type data generation processing and second type data generation processing using the acquired first learning data ($S_0$, $C_1$, $C_2$).

The first type data generation processing is processing for generating first type generation data by the voice signal conversion model on the basis of the acquired first learning data. The first type generation data is data having a first type generation signal, conversion source speaker information, and conversion destination speaker information. Therefore, if the first type generation data is represented by a symbol following the expression of the first learning data, the first type generation data is represented by [$S_1$, $C_1$, $C_2$] if the first type generation signal is $S_1$.

The second type data generation processing is processing for generating second type generation data on the basis of the first type generation data generated by first type data generation processing. The second type generation data includes a second type generation signal, conversion source speaker information, and conversion destination speaker information. The second type generation signal is a voice signal (hereinafter referred to as a "reverse voice signal") represented by an execution result of first type data generation processing for data for reverse generation.

The data for reverse generation is first learning data in which the conversion source speaker information of the first type generation data is conversion destination speaker information, the conversion destination speaker information of the first type generation data is conversion source speaker information, and the first type generation signal is a first learning voice signal. Therefore, if the data for reverse generation is represented by a symbol following the expression of the first learning data, the data for reverse generation is represented by ($S_1$, $C_2$, $C_1$).

Since the data for reverse generation is represented by ($S_1$, $C_2$, if the second type generation data is represented by a symbol following the expression of the first learning data, the second type generation data is represented by [$S_2$, $C_2$, $C_1$] when the reverse voice signal is $S_2$. In this manner, second type data generation processing is first type data generation processing for the data for reverse generation.

The generation unit 110 outputs the generated first type generation data to the identification unit 120. The generation unit 110 outputs the generated second type generation data to the loss acquisition unit 140.

Hereinafter, a pair of information including the conversion source speaker information and the conversion destination speaker information included in the first type generation data is referred to as first pair information. Hereinafter, a pair of information including the random speaker information and the speaker identification information included in the second learning data is referred to as second pair information. Both the first pair information and the second pair information are pairs of information indicating a speaker. Therefore, when the first pair intonation and the second pair intonation are not distinguished from each other, they are referred to as pair information hereinafter. Further, both the first pair information and the second pair information include information indicating a speaker set in advance by a user or the like as a speaker of a voice signal included in the first type generation data or the second learning data including pair information. Specifically, the conversion destination speaker intonation included in the first type generation data is information included in the first pair information and indicating a speaker set in advance, and the speaker identification information included in the second learning data is information included in the second pair information and indicating a speaker set in advance. Hereinafter, when the conversion destination speaker information included in the first type generation data and the speaker identification information included in the second learning data are not distinguished from each other, they are referred to as a speaker setting information.

The identification unit 120 executes voice estimation processing. Voice estimation processing is processing for estimating whether or not a voice signal that is a processing target is a voice signal representing a vocal sound actually uttered by a speaker indicated by speaker setting information among information indicated by pair information on the basis of pair information of the voice signal that is the processing target.

A voice signal that is a processing target of the identification unit 120 is data input to the identification unit 120 and is a voice (hereinafter referred to as "identification voice") represented by a voice signal represented by data (hereinafter referred to as "identification input data") including the voice signal. The identification input data is specifically the first type generation data and the second learning data. An estimation result of the identification unit 120 is output to the loss acquisition unit 140.

The determination unit 130 determines which of the first type generation data and the second learning data is the identification input data according to a predetermined rule. The predetermined rule may be any rule as long as the identification input data can be determined, and for example, is a rule of determining the first learning data and the second learning data as the identification input data at equal probability using a random number generated by a random number generator.

When the determination unit 130 has determined the first type generation data as the identification input data, the determination unit 130 determines first learning data to be input to the generation unit 110 from among a plurality of pieces of data included in a first learning data group according to a predetermined rule. The first learning data group is a set of first learning data. The predetermined rule may be any rule as long as the first learning data to be input to the generation unit 110 can be determined from a plurality of pieces of data included in the first learning data group. The predetermined rule may be, for example, a rule according to an order previously given to each piece of data. The predetermined rule may follow random sampling.

When the determination unit 130 has determined the second learning data as the identification input data, the determination unit 130 determines the second learning data to be input to the identification unit 120 from among a plurality of pieces of data included in a second learning data group according to a predetermined rule. The predetermined rule may be, for example, a rule according to an order previously given to each piece of data. The predetermined rule may follow random sampling. The second learning data group is a set of second learning data. Each piece of data of the first learning data group and the second learning data group is data stored in a storage unit which is included in the voice signal conversion model learning device 1 and will be described later.

The determination unit 130 outputs information (hereinafter referred to as "route information") representing whether the identification input data has been determined as the first type generation data or the second learning data to the loss acquisition unit 140.

When the determination unit 130 has determined the first type generation data as the identification input data, the generation unit 110 acquires the first learning data determined as the first learning data to be input to the generation unit 110 by the determination unit 130. When the determination unit 130 has determined the second learning data as the identification input data, the identification unit 120 acquires the second learning data determined by the determination unit 130 as the second learning data to be input to the identification unit 120.

When the second learning data has been determined as the identification input data, the determination unit 130 also determines random speaker information.

The loss acquisition unit 140 acquires the identification input data, the second type generation data, and the route information, and acquires a value of an objective function L (hereinafter referred to as "objective loss") represented by the following formulas (1) to (4). The objective function L includes an extended adversarial loss function represented by the following formula (2), a cyclic loss function represented by the following formula (3), and an identity loss function represented by the following formula (4).

[Math. 1]

$$L=L_{st\_adv}+\lambda_{cyc}L_{cyc}+\lambda_{id}L_{id} \quad (1)$$

[Math. 2]

$$L_{st\_adv}=\mathbb{E}_{(x,c_1)\sim P(x,c_1),c_2\sim P(c_2)}[\log D(x,c_2,c_1)]+\mathbb{E}_{(x,c_1)\sim P(x,c_1),c_2\sim P(c_2)}[\log D(G(x,c_1,c_2),c_1,c_2)] \quad (2)$$

[Math. 3]

$$L_{cyc}=\mathbb{E}_{(x,c_1)\cdot P(x,c_1),c_2\sim P(c_2)}[(\|x-G(G(x,c_1,c_2),c_2,c_1)\|_1] \quad (3)$$

[Math. 4]

$$L_{id}=\mathbb{E}_{(x,c_1)\sim P(x,c_1)}[\|G(x,c_1,c_1)-x\|_1] \quad (4)$$

D indicates mapping from identification input data by natural voice estimation processing and speaker estimation processing executed by the identification unit 120 to an estimation result. G indicates mapping representing conversion of data by first type data generation processing executed by the generation unit 110.

X indicates a voice signal represented by the identification input data. Among the subscripts of E in the formulas (2) to (4), $(x,c_1)$ $P(x,c_1)$ indicates that an acoustic feature amount x and speaker information $c_1$ corresponding to the acoustic feature amount x are sampled from a distribution $P(x,c_1)$ of learning data. The speaker intonation means conversion source speaker intonation, conversion destination speaker information, random speaker information or speaker identification information. The distribution of learning data specifically represents a probability distribution having a feature amount of the first learning data in the first learning data group as a probability variable. That is, $P(x,c_1)$ is a multidimensional distribution in which the horizontal axis represents each dimension of $(x,c_1)$. E represents an expectation value.

Among the subscripts of E in the formulas (2) to (4), $c_2\sim P(c_2)$ represents that speaker information is randomly sampled.

In addition, x, $c_1$ and $c_2$ of the first term of the right side of the formula (2) represent $S'_0$, $C'_1$, $C'_2$ of the second learning data in order. In addition, $c_1$ and $c_2$ of the second term of the right side of the formula (2) represent $C_1$ and $C_2$ of the first learning data and the first type generation data in order, x represents $S_0$ of the first learning data, and $G(x,c_1,c_2)$ represents $S_1$ of the first type generation data. In addition, $c_1$ and $c_2$ of the right side of the formula (3) represent $C_1$ and $C_2$ of the first learning data, the data for reverse generation, and the second type generation data in order. In addition, x of the right side of the formula (3) represents $S_0$ of the first learning data. In addition, $G(x,c_1,c_2)$ of the right side of the formula (3) represents $S_1$ of the data for reverse generation, and $G(G(x,c_1,c_2)c_2,c_1)$ represents $S_2$ of the second type generation data. Further, x of the right side of the formula (4) represents $S_0$ of the first learning data, and $c_1$ represents $C_1$ and $C_2$ of the first learning data.

The value of the extended adversarial loss function (hereinafter referred to as "extended adversarial loss") indicates differences between the sound quality and speaker estimated by the identification unit 120 and the sound quality and speaker of the identification voice. The speaker of the identification voice is the speaker indicated by the conversion destination speaker information when the route intonation indicates that the first type generation data is the identification input data, and is the speaker indicated by the speaker identification information when the route information indicates that the second learning data is the identification input data. When the identification voice is the second learning voice, the sound quality of the identification voice is a natural voice set, and when the identification voice is the first type generation voice, the sound quality of the identification voice is a synthetic voice set.

The value of the cyclic loss function (hereinafter referred to as "cyclic loss") indicates a difference between the voice signal represented by the second type generation data (that is, the second type generation signal) and the voice signal represented by the first learning data (that is, the first learning voice signal).

The identity loss function is a loss function introduced to restrict the first learning voice and the first type generation voice such that the two voices become identical when the speaker indicated by the conversion source speaker information of the first learning data input to the generation unit 110 and the speaker indicated by the conversion destination speaker information of the first learning data are identical.

The objective loss acquired by the loss acquisition unit 140 is output to the generation unit 110 and the identification unit 120. The generation unit 110 and the identification unit 120 perform learning on the basis of the objective loss. More specifically, for example, the generation unit 110 performs learning such that the objective loss decreases, and the identification unit 120 performs learning such that the extended adversarial loss function increases. The generation unit 110 and the identification unit 120 may be any one as long as they can perform learning on the basis of the objective loss, and the generation unit 110 and the identification unit 120 are, for example, a neural network.

Figure 3:
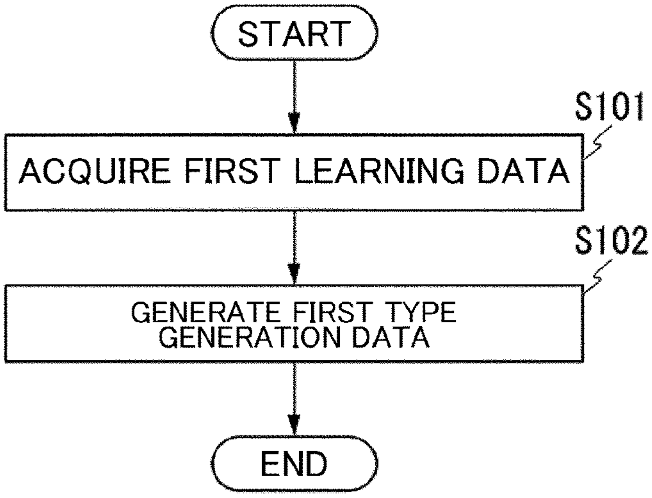
FIG. 3 is an explanatory diagram illustrating an example of a flow of first type data generation processing in the embodiment.

FIG. 3 is an explanatory diagram illustrating an example of a flow of first type data generation processing in the embodiment.

The generation unit 110 acquires first learning data (step S101). Next, the generation unit 110 generates first type generation data on the basis of the first learning data (step S102).

Figure 4:
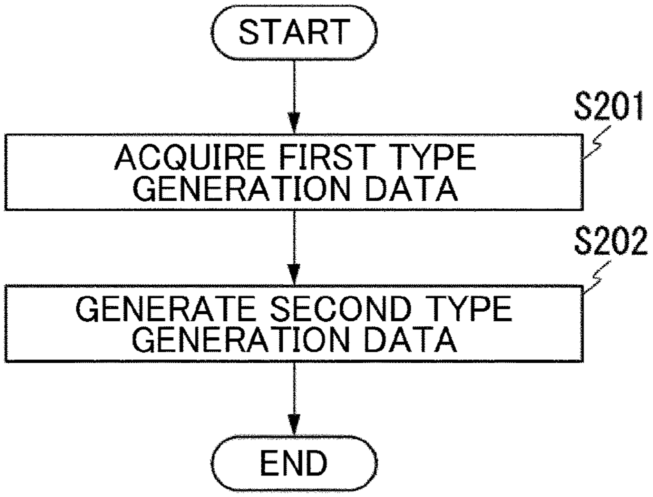
FIG. 4 is an explanatory diagram illustrating an example of a flow of second type data generation processing in the embodiment.

FIG. 4 is an explanatory diagram illustrating an example of a flow of second type data generation processing in the embodiment.

The generation unit 110 acquires first type generation data (step S201). Processing in step S201 may be processing in step S102 or processing in which the generation unit 110 re-acquires the first type generation data generated in processing in step S102. Next, the generation unit 110 generates second type generation data by executing first type data generation processing on data for reverse generation on the basis of the first type generation data (step S202).

Figure 5:
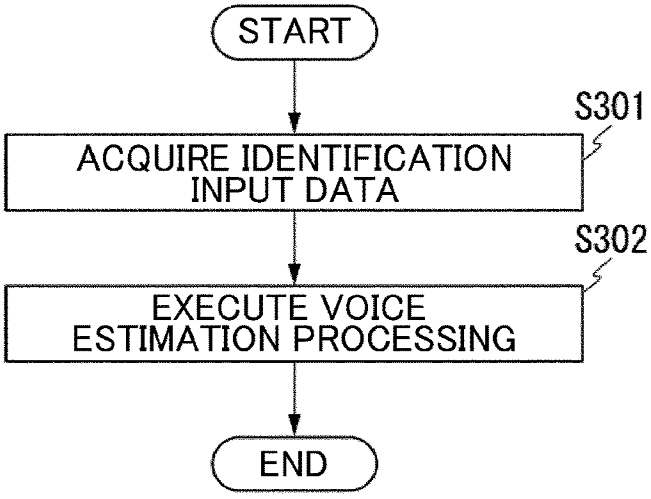
FIG. 5 is an explanatory diagram illustrating an example of a flow of processing executed by an identification unit 120 in the embodiment.

FIG. 5 is an explanatory diagram illustrating an example of a flow of processing executed by the identification unit 120 in the embodiment. The identification unit 120 acquires identification input data (step S301). The identification unit 120 executes voice estimation processing (step S302).

Figure 6:
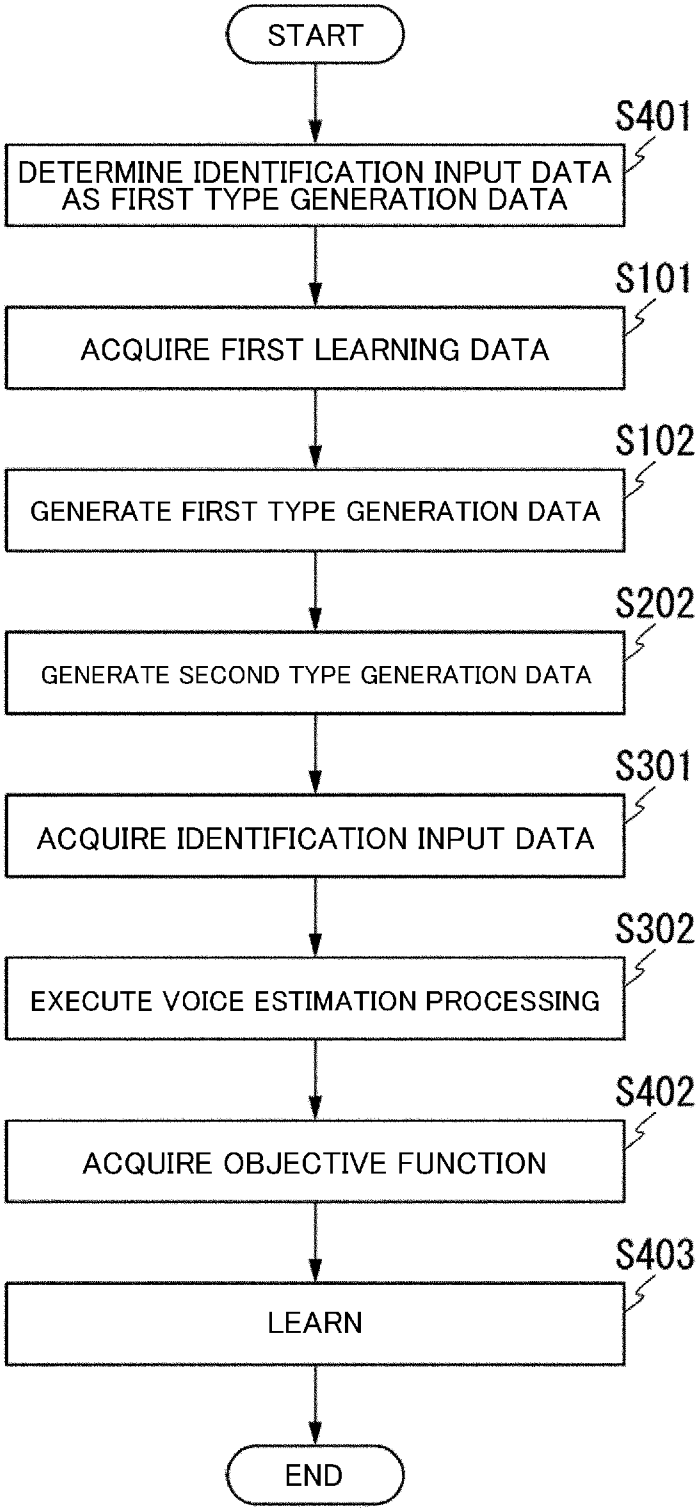
FIG. 6 is a first diagram showing an example of a flow of processing executed by the voice signal conversion model learning device 1 of the embodiment.

FIG. 6 is a first diagram showing an example of a flow of processing executed by the voice signal conversion model learning device 1 of the embodiment. The same processing as that shown in FIG. 3 to FIG. 5 is denoted by the same reference numerals as those in FIGS. 3 to 5, and description thereof is omitted.

The determination unit 130 determines the identification input data as the first type generation data (step S401). Next, processing of step S101 is executed. Next, processing of step S102 is executed. Next, processing of step S202 is executed. Next, processing of step S301 is executed. Next, processing of step S302 is executed. Next, the loss acquisition unit 140 acquires objective loss on the basis of the first learning data acquired in step S101, the second type generation data, and the estimation result of step S302 (step S402). The generation unit 110 and the identification unit 120 perform learning on the basis of the objective loss (step S403).

Figure 7:
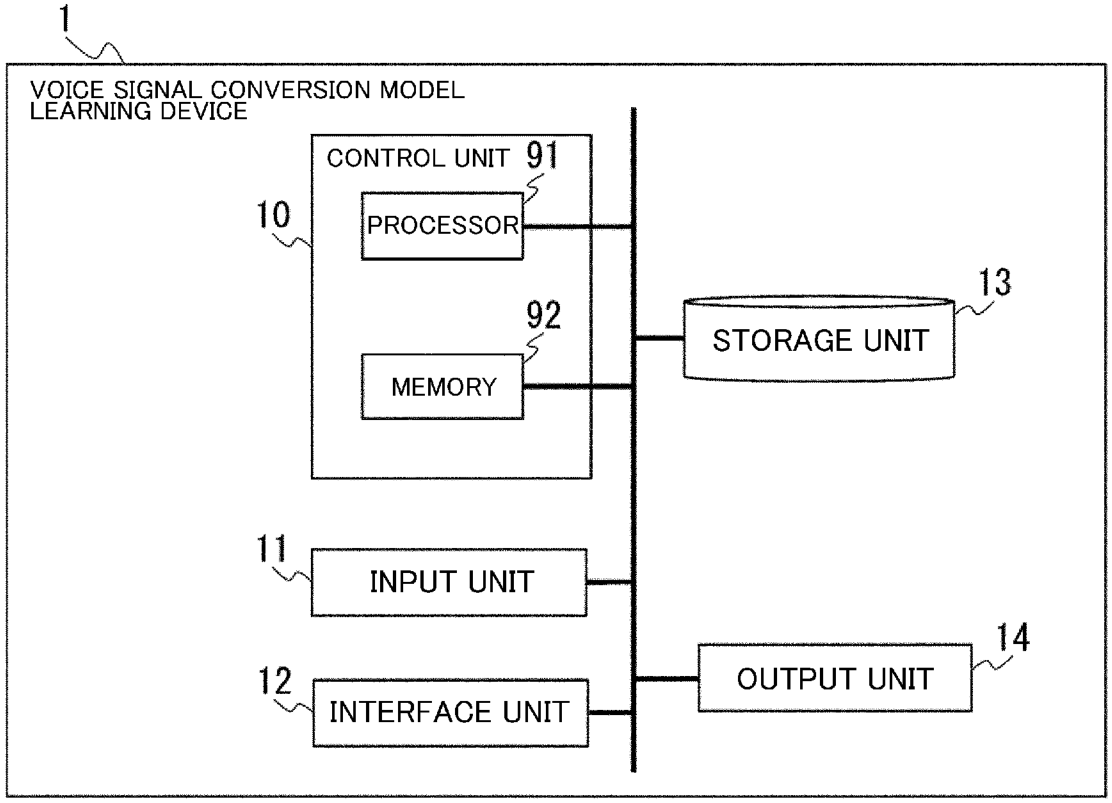
FIG. 7 is a diagram showing an example of a hardware configuration of the voice signal conversion model learning device 1 of the embodiment.

FIG. 7 is a diagram showing an example of a hardware configuration of the voice signal conversion model learning device 1 of the embodiment.

The voice signal conversion model learning device 1 includes a control unit 10 including a processor 91 such as a central processing unit (CPU) and a memory 92, which are connected through a bus, and executes a program. The voice signal conversion model learning device 1 functions as a device including the control unit 10, an input unit 11, an interface unit 12, a storage unit 13, and an output unit 14 by executing the program. More specifically, the processor 91 reads the program stored in the storage unit 13 and stores the read program in the memory 92. According to the processor 91 executing the program stored in the memory 92, the voice signal conversion model learning device 1 functions as a device including the control unit 10, the input unit 11, the interface unit 12, the storage unit 13, and the output unit 14.

The control unit 10 controls operations of various functional units included in the voice signal conversion model learning device 1. The control unit 10 executes, for example, first type data generation processing. The control unit 10 executes, for example, second type data generation processing. The control unit 10 executes, for example, natural voice estimation processing. The control unit 10 executes, for example, speaker estimation processing.

The input unit 11 includes an input device such as a mouse, a keyboard, and a touch panel. The input unit 11 may also be configured as an interface for connecting these input devices to the host device.

The input unit 11 receives inputs of various types of information to the host device. The input unit 11 receives an input for instructing the start of learning, for example. The input unit 11 receives an input of data to be added to, for example, the first learning data group. The input unit 11 receives an input of data to be added to, for example, the second learning data group.

The interface unit 12 includes a communication interface for connecting the host device to an external device. The interface unit 12 communicates with the external device in a wired or wireless manner. The external device may be, for example, a storage device such as a Universal Serial Bus (USB) memory. When the external device outputs, for example, the first learning data, the interface unit 12 acquires the first learning data output from the external device through communication with the external device. When the external device outputs, for example, the second learning data, the interface unit 12 acquires the second learning data output from the external device through communication with the external device.

The interface unit 12 includes a communication interface for connecting the host device to the voice signal conversion device 2. The interface unit 12 communicates with the voice signal conversion device 2 in a wired or wireless manner. The interface unit 12 outputs a learned voice signal conversion model to the voice signal conversion device 2 through communication with the voice signal conversion device 2. "Learned" means that a predetermined termination condition is satisfied.

The storage unit 13 is configured using a non-transitory computer-readable storage medium device such as a magnetic hard disk device or a semiconductor storage device. The storage unit 13 stores various types of information regarding the voice signal conversion model learning device 1. The storage unit 13 stores, for example, the voice signal conversion model. The storage unit 13 stores, for example, the first learning data group in advance. The storage unit 13 stores, for example, the second learning data group in advance. The storage unit 13 stores first learning data and second learning data input via, for example, the input unit 11 or an interface unit 12. The storage unit 13 stores, for example, an estimation result of the identification unit 120.

The output unit 14 outputs various types of intonation. The output unit 14 includes a display device such as a cathode ray tube (CRT) display, a liquid crystal display, or an organic electroluminescence (EL) display. The output unit 14 may also be configured as an interface for connecting such a display device to the host device. The output unit 14 outputs, for example, information input to the input unit 11.

Figure 8:
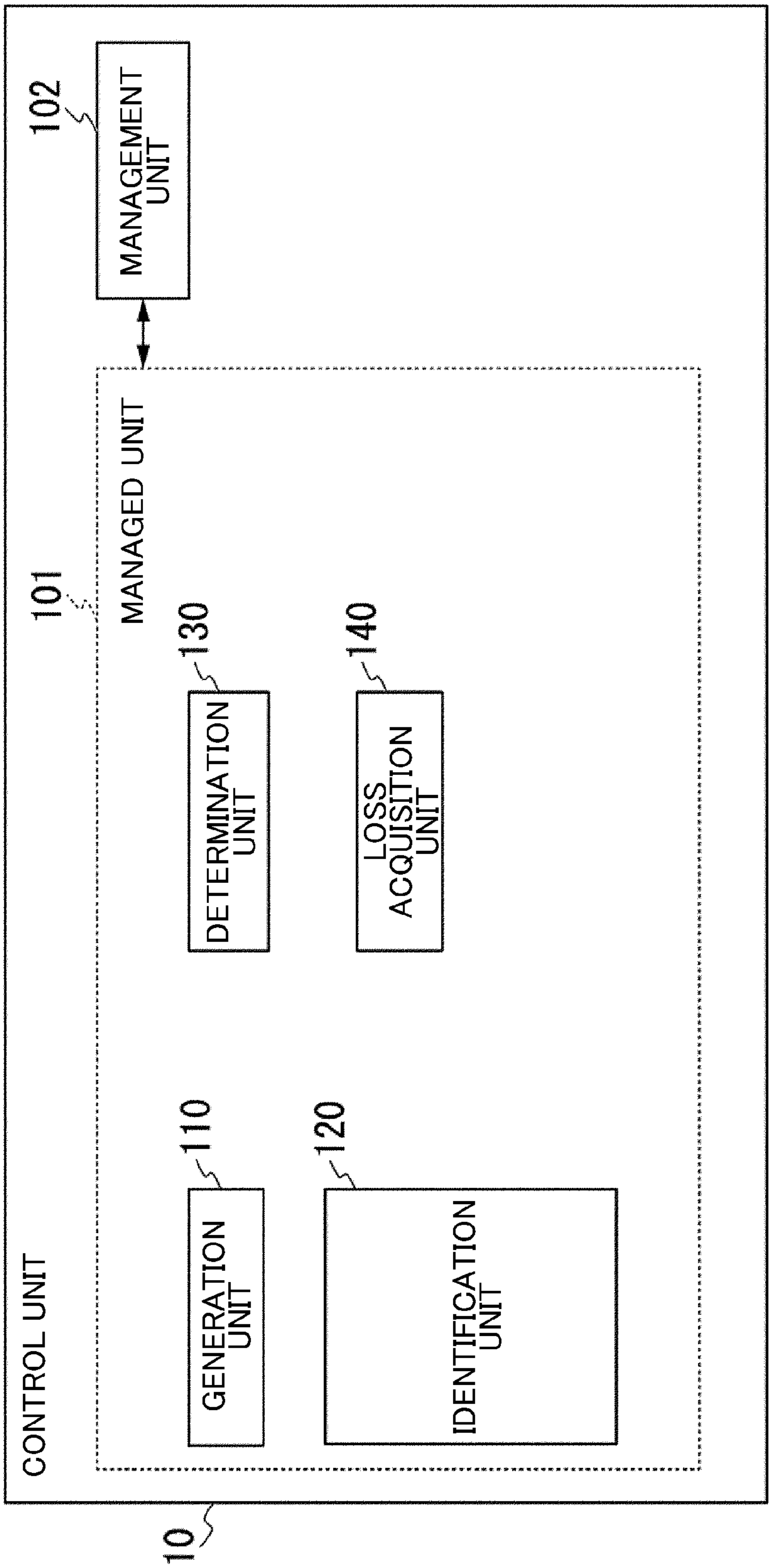
FIG. 8 is a diagram showing an example of a functional configuration of a control unit 10 in the embodiment.

FIG. 8 is a diagram showing an example of a functional configuration of the control unit 10 in the embodiment.

The control unit 10 includes a managed unit 101 and a management unit 102. The managed unit 101 includes a generation unit 110, an identification unit 120, a determination unit 130, and a loss acquisition unit 140. The managed unit 101 updates the voice signal conversion model using the first learning data and the second learning data until termination conditions are satisfied.

The management unit 102 controls the operation of the managed unit 101. The management unit 102 controls timing of processing executed by, for example, the generation unit 110, the identification unit 120, the determination unit 130, and the loss acquisition unit 140 included in the managed unit 101.

The management unit 102 controls operations of, for example, the input unit 11, the interface unit 12, the storage unit 13, and the output unit 14. The management unit 102 reads various types of information from, for example, the storage unit 13 and outputs the intonation to the managed unit 101. The management unit 102 acquires, for example, information input to the input unit 11 and outputs the information to the managed unit 101. The management unit 102 acquires, for example, information input to the input unit 11 and records the information in the storage unit 13. The management unit 102 acquires, for example, intonation input to the interface unit 12 and outputs the intonation to the managed unit 101. The management unit 102 acquires, for example, information input to then interface unit 12 and records the information in the storage unit 13. The management unit 102 outputs, for example, information input to the input unit 11 to the output unit 14.

The management unit 102 records, for example, the first type generation data generated by the generation unit 110 in the storage unit 13. The management unit 102 records, for example, a result of the identification unit 120 in the storage unit 13. The management unit 102 records, for example, a determination result of the determination unit 130 in the storage unit 13. The management unit 102 records, for example, loss acquired by the loss acquisition unit 140 in the storage unit 13.

Figure 9:
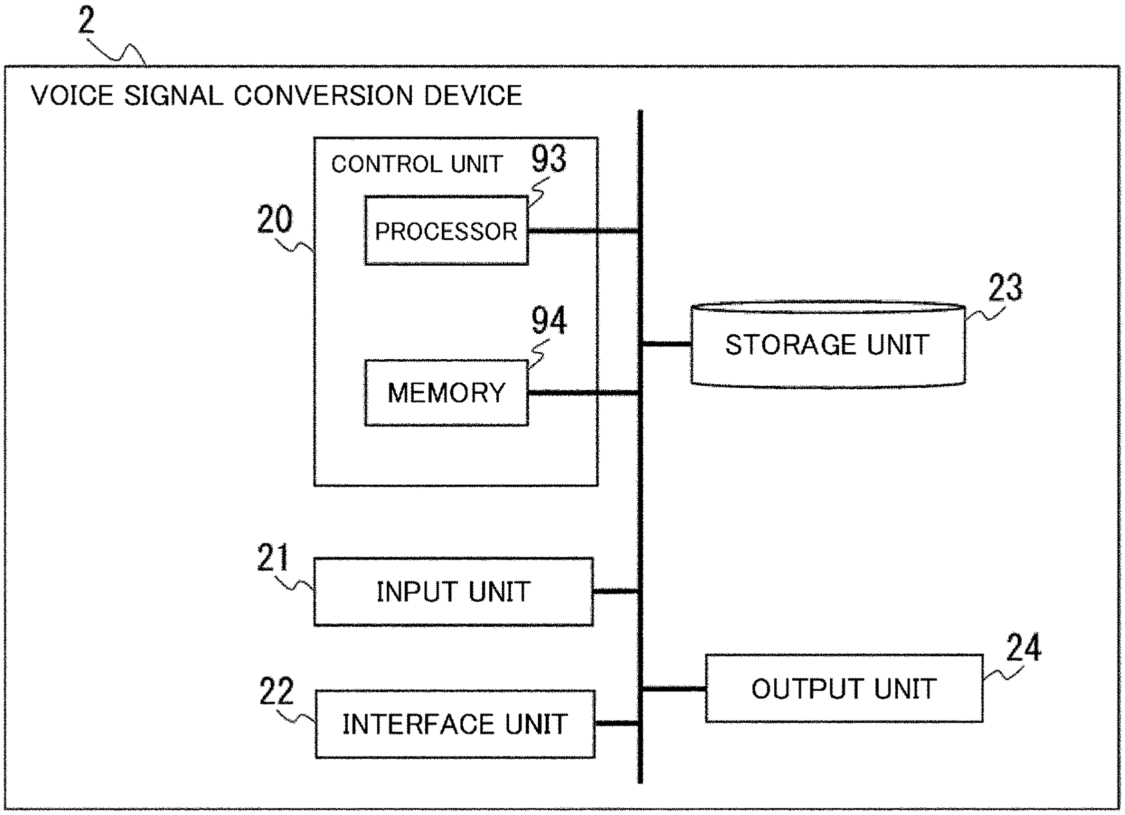
FIG. 9 is a diagram showing an example of a hardware configuration of a voice signal conversion device 2 in the embodiment.

FIG. 9 is a diagram showing an example of a hardware configuration of the voice signal conversion device 2 in the embodiment.

The voice signal conversion device 2 includes a control unit 20 including a processor 93 such as a central processing unit (CPU) and a memory 94, which are connected through a bus, and executes a program. The voice signal conversion device 2 functions as a device including the control unit 20, an input unit 21, an interface unit 22, a storage unit 23, and an output unit 24 by executing the program. More specifically, the processor 93 reads the program stored in the storage unit 23 and stores the read program in the memory 94. According to the processor 93 executing the program stored in the memory 94, the voice signal conversion device 2 functions as a device including the control unit 20, the input unit 21, the interface unit 22, the storage unit 23, and the output unit 24.

The control unit 20 controls operations of various functional units included in the voice signal conversion device 2. The control unit 20 converts a conversion target voice signal into a converted voice signal using, for example, the learned voice signal conversion model obtained by the voice signal conversion model learning device 1.

The input unit 21 includes input devices such as a mouse, a keyboard, and a touch panel. The input unit 21 may also be configured as an interface for connecting these input devices to the host device. The input unit 21 receives inputs of various types of information to the host device. The input unit 21 receives an input for instructing start of processing for converting, for example, a conversion target voice signal into a converted voice signal. The input unit 21 receives, for example, an input of a conversion target voice signal that is a conversion target.

The interface unit 22 includes a communication interface for connecting the host device to an external device. The interface unit 22 communicates with the external device in a wired or wireless manner. The external device is, for example, an output destination of a conversion target voice signal. In such a case, the interface unit 22 outputs the conversion target voice signal to the external device through communication with the external device. The external device at the time of outputting the conversion target voice signal is, for example, a voice output device such as a speaker.

The external device may be, for example, a storage device such as a USB memory storing the learned voice signal conversion model. When the external device stores, for example, the learned voice signal conversion model and outputs the learned voice signal conversion model, the interface unit 22 acquires the learned voice signal conversion model through communication with the external device.

The external device is, for example, an output source of a conversion target voice signal. In such a case, the interface unit 22 acquires the conversion target voice signal from the external device through communication with the external device.

The interface unit 22 includes a communication interface for connecting the host device to the voice signal conversion model learning device 1. The interface unit 22 communicates with the voice signal conversion model learning device 1 in a wired or wireless manner. The interface unit 22 acquires a learned voice signal conversion model from the voice signal conversion model learning device 1 through communication with the voice signal conversion model learning device 1.

The storage unit 23 is configured using a non-transitory computer-readable storage medium device such as a magnetic hard disk device or a semiconductor storage device. The storage unit 23 stores various types of information regarding the voice signal conversion device 2.

The storage unit 23 stores, for example, the learned voice signal conversion model acquired via the interface unit 22.

The output unit 24 outputs various types of information. The output unit 24 includes a display device such as a CRT display, a liquid crystal display, or an organic EL display. The output unit 24 may also be configured as an interface for connecting such a display device to the host device. The output unit 24 outputs, for example, information input to the input unit 21.

Figure 10:
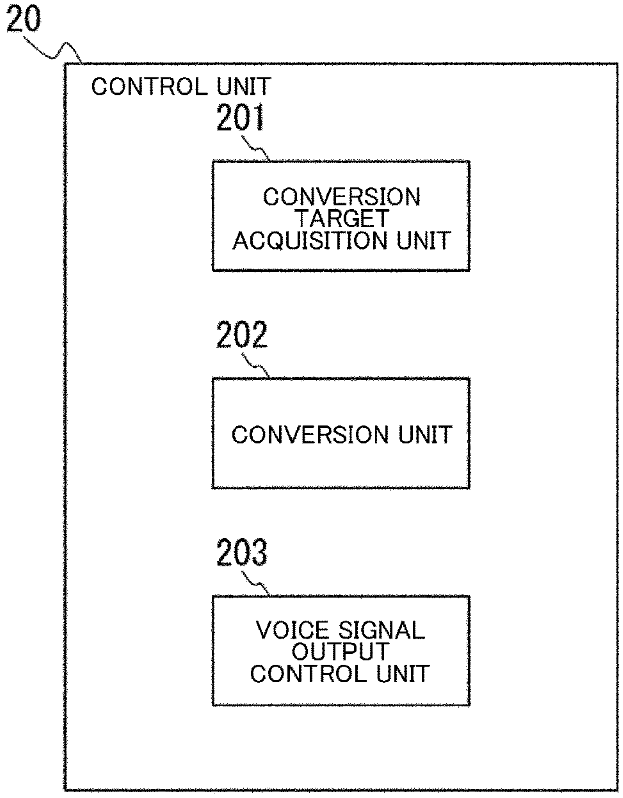
FIG. 10 is a diagram showing an example of a functional configuration of a control unit 20 in the embodiment.

FIG. 10 is a diagram showing an example of a functional configuration of the control unit 20 in the embodiment. The control unit 20 includes a conversion target acquisition unit 201, a conversion unit 202, and a voice signal output control unit 203.

The conversion target acquisition unit 201 acquires a conversion target voice signal that is a conversion target. The conversion target acquisition unit 201 acquires, for example, a conversion target voice signal input to the input unit 21. The conversion target acquisition unit 201 acquires, for example, a conversion target voice signal input to the interface unit 22.

The conversion unit 202 converts the conversion target acquired by the conversion target acquisition unit 201 into a converted voice signal using the learned voice signal conversion model. The converted voice signal is output to the voice signal output control unit 203.

The voice signal output control unit 203 controls the operation of the interface unit 22. The voice signal output control unit 203 controls the operation of the interface unit 22 to cause the interface unit 22 to output the converted voice signal.

Figure 11:
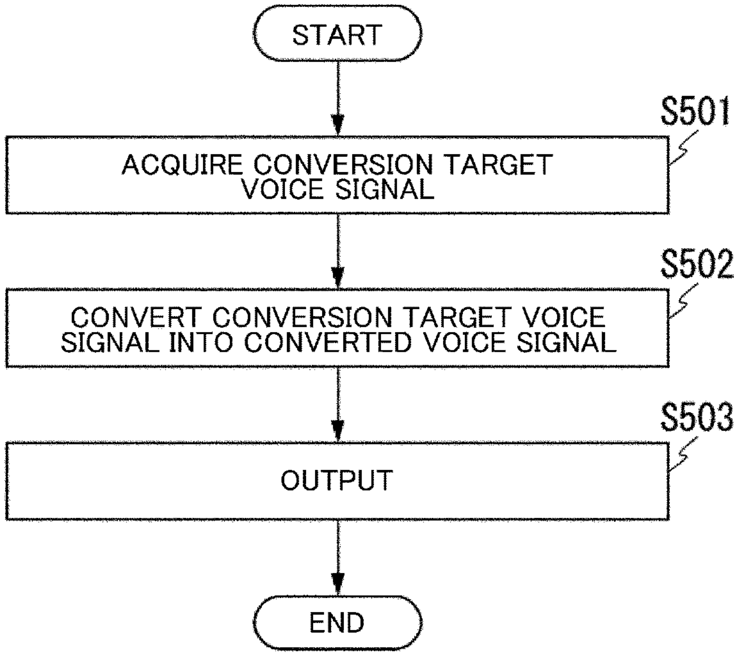
FIG. 11 is a flowchart showing an example of a flow of processing executed by the voice signal conversion device 2 in the embodiment.

FIG. 11 is a flowchart showing an example of a flow of processing executed by the voice signal conversion device 2 in the embodiment. The control unit 20 acquires a conversion target voice signal input to the interface unit 22 (step S501). Next, the control unit 20 converts the conversion target voice signal into a converted voice signal using a learned voice signal conversion model stored in the storage unit 23 (step S502). Next, the control unit 20 controls the operation of the interface unit 22 to cause the converted voice signal to be output to an output destination (step S503). The output destination is, for example, an external device such as a speaker.

The voice signal generation system 100 of the embodiment configured in this manner performs learning using conversion source speaker information, conversion destination speaker information, and speaker identification information and obtains a learned voice signal conversion model. Therefore, the voice signal generation system 100 can convert a voice represented by a voice signal that is a conversion target into a voice signal representing a voice closer to the voice of the speaker represented by the conversion destination speaker information than a voice signal converted on the basis of only the conversion destination speaker information. Therefore, the voice signal generation system 100 can convert a voice having a more appropriate experience distribution even when there are many candidates for both an attribute of a conversion source and an attribute of a conversion destination.

First Modified Example

The objective function may include the extended adversarial loss function and does not necessarily include the cyclic loss function and the identity loss function. The objective function may be, for example, the extended adversarial loss function, may include the extended adversarial loss function and the cyclic loss function and may not include the identity loss function, or may include the extended adversarial loss function and the identity loss function and may not include the cyclic loss function.

Although cross entropy is used as a measure in the description of the extended adversarial loss function, it may be based on any measure such as L2 distance and Wasserstine measurement. Although L1 distance is used in the description of the cyclic loss function, it may be based on any measure such as L2 distance. Although L1 distance is used in the description of the identity loss function, it may be based on any measure such as L2 distance.

Second Modified Example

The generation unit 110 does not necessarily use conversion source speaker information in first type data generation processing. This generation unit 110 has, for example, a configuration shown in FIG. 12 below.

Figure 12:
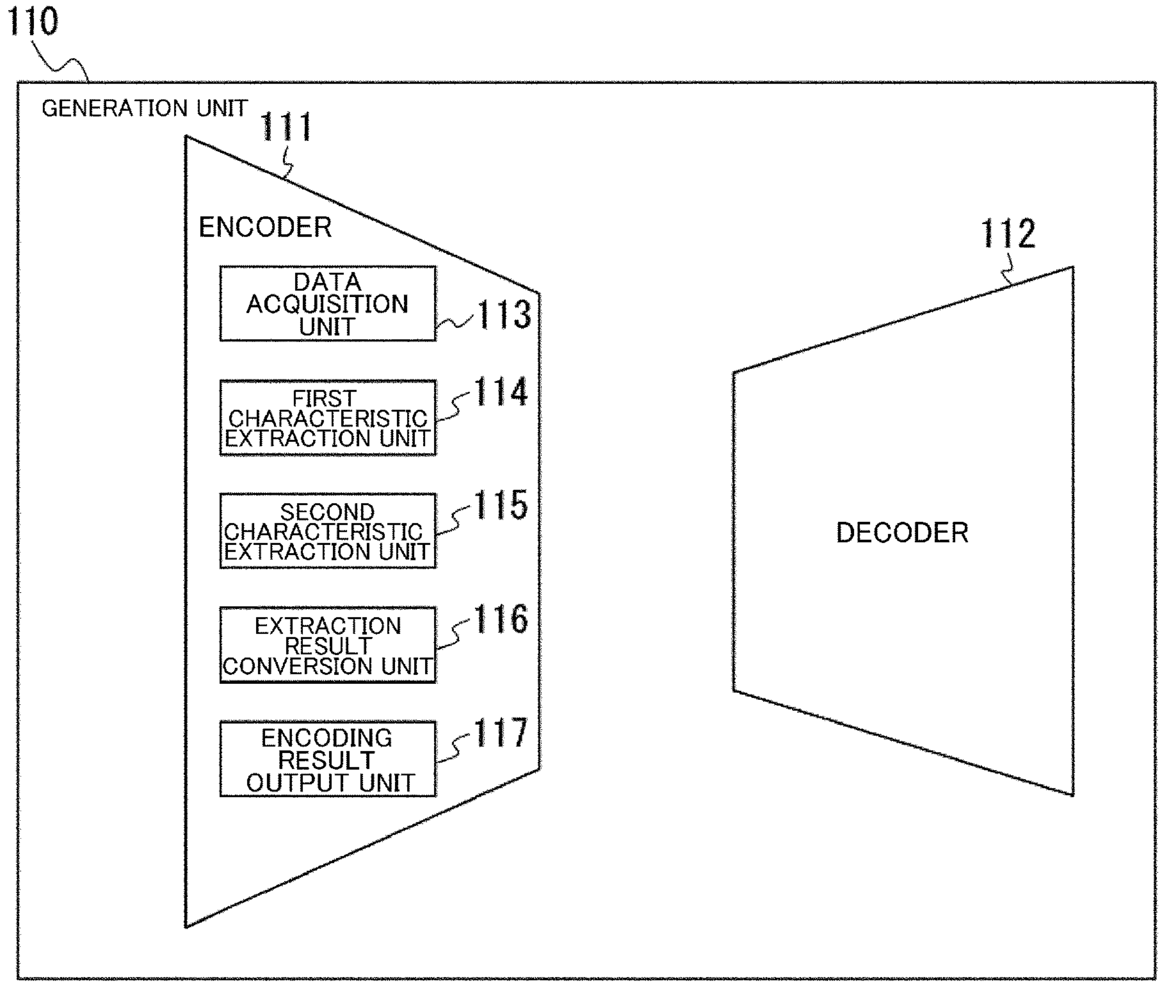
FIG. 12 is a diagram showing an example of a functional configuration of a generation unit 110 in a second modified example.

FIG. 12 is a diagram showing an example of a functional configuration of the generation unit 110 in a second modified example. The generation unit 110 includes an encoder 111 and a decoder 112.

The encoder 111 is a neural network having a convolution layer. The encoder 111 encodes first learning data. The encoder 111 includes a data acquisition unit 113, a first characteristic extraction unit 114, a second characteristic extraction unit 115, an extraction result conversion unit 116, and an encoding result output unit 117. The data acquisition unit 113 acquires first learning data input to the encoder 111. Specifically, the data acquisition unit 113 is an input layer of a neural network constituting the encoder 111.

The first characteristic extraction unit 114 executes first characteristic extraction processing. The first characteristic extraction processing is processing for acquiring information representing characteristics of a first learning voice signal of the first learning data (hereinafter referred to as "characteristic information"). The first characteristic extraction processing is, for example, processing for sequentially executing short-time Fourier transform for respective predetermined periods in a time axis direction. The first characteristic extraction processing may be processing for extracting a Melcepstrum or conversion processing using a neural network. Specifically, the first characteristic extraction unit 114 is a circuit that executes the first characteristic extraction processing. Therefore, the first characteristic extraction unit 114 is one of intermediate layers of the neural network constituting the encoder 111 when the first characteristic extraction processing is conversion processing using the neural network.

The second characteristic extraction unit 115 executes second characteristic extraction processing. The second characteristic extraction processing is processing for executing convolution processing in machine learning on characteristic information. The convolution processing in machine learning is processing for extracting characteristics of a processing target from the processing target. Therefore, the second characteristic extraction processing is processing for extracting intonation indicating characteristics different from the characteristics indicated by characteristic information of the processing target of the first characteristic extraction processing among the characteristics of the first learning voice signal. That is, the second characteristic extraction processing is also processing for acquiring characteristic information similarly to the first characteristic extraction processing. Specifically, the second characteristic extraction unit 115 is a convolution layer of the neural network constituting the encoder 111.

The extraction result conversion unit 116 executes extraction result conversion processing. The extraction result conversion processing converts an execution result of the second characteristic extraction processing according to extraction result conversion mapping on the basis of conversion destination speaker information. Extraction result conversion mapping is mapping updated according to an estimation result of the identification unit 120, mapping according to the conversion destination speaker information, and mapping for converting only the execution result of the second characteristic extraction processing between the conversion destination speaker information and the execution result of the second characteristic extraction processing (that is, characteristic information). Specifically, the extraction result conversion unit 116 is one of intermediate layers of the neural network constituting the encoder 111.

The extraction result conversion mapping executes affine transformation depending on at least the conversion destination speaker information on the execution result of the second characteristic extraction processing. The extraction result conversion mapping may be affine transformation depending on not only the conversion destination speaker information but also the conversion source speaker information. An example of affine transformation for the execution result of the second characteristic extraction processing is a function CIN represented by the following formula (5).

[Math. 5]

$$CIN(f;c_2)=\gamma_{c_2}\left(\frac{f-\mu(f)}{\sigma(f)}\right)+\beta_{c_2} \tag{5}$$

In formula (5), the tensor f is characteristic information. More specifically, the tensor f is a feature amount tensor in which each element represents a feature amount related to the first learning data. The tensor f is a tensor of at least third floor. μ(f) represents an average value of values of elements in the tensor of each second floor with respect to the tensor of each second floor perpendicular in a predetermined one direction of the tensor f. Therefore, μ(f) is a C-dimensional vector if the number of elements in the predetermined one direction is C. The predetermined one direction is, for example, a direction indicating a channel of a feature amount tensor on the third floor of height×width×channel extracted by CNN. The σ(f) represents the standard deviation of the values of the elements in the tensor of each second floor from which the μ(f) has been acquired. For this reason, σ(f) is a vector having the same number of elements as that of $\mu(f)$. The coefficients $\gamma_{c2}$ and $\beta_{c2}$ are parameters updated for each speaker indicated by conversion destination speaker information according to learning using the objective function L.

A series of processing of first characteristic extraction, the second characteristic extraction, and extraction result conversion processing is encoding of the first learning data by the encoder 111.

The encoding result output unit 117 outputs the encoded first learning data to the decoder 112. Specifically, the encoding result output unit 117 is an output layer of the neural network constituting the encoder 111.

The decoder 112 generates first type generation data on the basis of an output result of the encoder 111. Processing performed by the encoder 111 and the decoder 112 for generating the first type generation data on the basis of the first learning data is an example of first type data generation processing.

Figure 13:
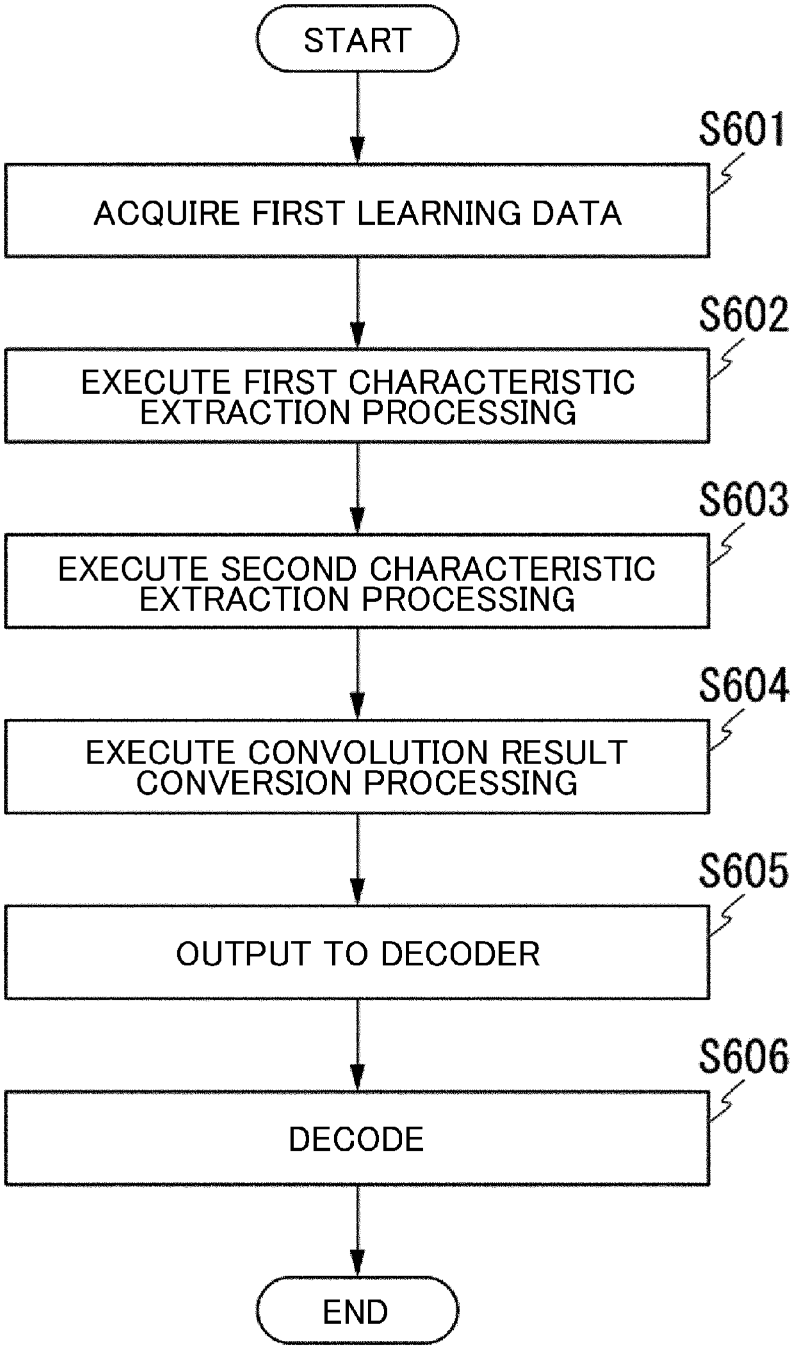
FIG. 13 is a flowchart showing an example of a flow of processing executed by the generation unit 110 in the second modified example.

FIG. 13 is a flowchart showing an example of a flow of processing executed by the generation unit 110 in the second modified example. The data acquisition unit 113 acquires first learning data (step S601). Next, the first characteristic extraction unit 114 executes first characteristic extraction processing (S602). Next, the second characteristic extraction unit 115 executes second characteristic extraction processing on characteristic information obtained by first characteristic extraction processing in step S602 (step S603). Next, the extraction result conversion unit 116 executes extraction result conversion processing on characteristic intonation obtained by second characteristic extraction processing of step S603 (step S604). Next, the encoding result output unit 117 outputs information obtained by processing of step S604 to the decoder (step S605). Next, the decoder 112 decodes the information output in step S605 (step S606). Information obtained by decoding in step S606 is first type generation data.

Processing of step S603 and step S604 may be repeatedly executed a plurality of times after first characteristic extraction processing is executed and before processing of step S605 is executed. In this case, an execution target of second and subsequent second characteristic extraction processing is information obtained by extraction result conversion processing of the characteristic information extracted by immediately previous second characteristic extraction processing.

As shown in FIG. 13, in encoding processing performed by the generation unit 110 in the second modified example, second characteristic extraction processing for characteristic information is executed. Accordingly, even when processing of step S603 and step S604 is executed a plurality of times, second characteristic extraction processing for the characteristic information is executed at least once in encoding processing performed by the generation unit 110 in the second modified example.

In the voice signal conversion model learning device 1 of the second modified example configured in this manner, when convolution processing is executed by the convolution layer, convolution processing is executed on information independent of conversion destination speaker information, and the execution result of convolution processing is converted depending on the conversion destination speaker information. Therefore, the voice signal conversion model learning device 1 of the second modified example can process intonation while maintaining the level of orthogonality between a space representing conversion destination speaker information and a space representing characteristic information, as compared to a technique for performing convolution including the conversion destination speaker information at the time of performing convolution processing. Here, orthogonality means a degree to which an expression space representing a voice signal and an expression space representing information indicating a conversion destination are orthogonal to each other.

The lower orthogonality is, the more the boundary between conversion destination speaker information and characteristic information included in one piece of information becomes unclear, and thus the amount of calculation increases in the case of encoding or decoding. Therefore, the voice signal conversion model learning device 1 of the second modified example capable of maintaining orthogonality can reduce the amount of calculation as compared to the technique for performing convolution including conversion destination speaker information at the time of performing convolution processing.

Further, in the voice signal conversion model learning device 1 of the second modified example configured as described above, it is possible to efficiently execute conversion of characteristic information different for respective speakers for the following reason. The reason for this is as follows. In order to realize many-to-many voice conversion by a single model, it is important that conversion of characteristic intonation different for respective speakers can be performed selectively depending on speaker information. However, in the conventional technique for performing convolution including conversion destination speaker information at the time of executing convolution processing, speaker information is used as a part of information to be convoluted, and thus selection of characteristic information depending on the speaker information is not directly executed.

On the other hand, in the voice signal conversion model learning device 1 of the second modified example, it is possible to directly express the strength of characteristic information for each speaker using parameters which can be learned, as in the affine transformation represented by formula (5). Therefore, the voice signal conversion model learning device 1 of the second modified example can efficiently execute conversion of characteristic information different for respective speakers as compared to the conventional technique. Meanwhile, the parameters which can be learned indicate coefficients $\gamma_{c2}$ and $\beta_{c2}$ in the case of formula (5). That is, the voice signal conversion model learning device 1 of the second modified example configured in this manner can provide a technique for curbing an increase in the number of parameters used in a mathematical model representing voice conversion.

The generation unit 110 of the second modified example may be applied to any device as long as it is a device (hereinafter referred to as a “general generation network”) including a generator such as an adversarial generation network (GAN), and a discriminator, which are updated by learning, in which the generator outputs a value on the basis of conversion destination speaker information. In such a case, the generation unit 110 of the second modified example operates as a generation unit included in the general generation network. For example, the StarGAN of NPL 1 is an example of the general generation network, and StarGAN of NPL 1 may use the generation unit 110 of the second modified example instead of the generator included in StarGAN of NPL 1. In this case, attribute in NPL 1 is conversion destination speaker information in the voice signal generation system 100.

Third Modified Example

Although the voice signal generation system 100 for converting a speaker with respect to conversion of a voice signal has been described, voice conversion of the voice signal generation system 100 may not necessarily be conversion of a speaker as long as the attribute of a voice signal can be converted. In such a case, in the voice signal generation system 100, conversion source attribute intonation is used instead of conversion source speaker intonation, conversion destination attribute information is used instead of conversion destination speaker information, and attribute identification information is used instead of speaker identification information. The conversion source attribute information indicates an attribute to which the first learning voice belongs. The conversion destination speaker information indicates an attribute which is a preset attribute to which the first type generation voice belongs. The attribute identification information indicates an attribute which is a preset attribute to which the second learning voice belongs. Random speaker information is information indicating an attribute randomly determined by the determination unit 130 among a plurality of attributes prepared in advance. In such a case, voice estimation processing is processing for estimating whether or not the voice signal is a voice signal having an attribute to which a processing target belongs and representing a voice actually uttered.

Although a speaker is one of attributes, the attribute may be, for example, a gender as another attribute. In such a case, the voice signal generation system 100 converts a voice signal of a male voice into a voice signal of a female voice, for example. The attribute may be, for example, emotion. In such a case, the voice signal generation system 100 converts a voice representing a joy feeling into a voice representing a sad feeling, for example. The attribute may be, for example, a type of pronunciation. In such a case, the voice signal generation system 100 converts non-native English into native English, for example. The attribute may be an attribute relating to the quality of voice. The attribute relating to the quality of voice is, for example, an attribute indicating either a synthetic voice or a natural voice. The natural voice is a vocal sound actually uttered by a person, and the synthetic voice is a voice generated by a device such as a computer. In such a case, the voice signal generation system 100 converts, for example, a synthetic voice into a natural voice.

(Experimental Results of Experiments Using Voice Signal Generation System 100 Obtained by Combining Embodiment and First to Third Modified Examples)

FIG. 14 is a diagram of results of experiments (hereinafter referred to as "first experiments") showing differences in Mel-cepstral distortion (MCD) and differences in a modulation spectra distance (MSD) due to differences in an objective function used for learning a voice signal conversion model.

In the first experiments, an experiment (hereinafter referred to as a "(1-1)th experiment") of learning the voice signal conversion model using a speaker identification loss function $L_{cls}$, an adversarial loss function $L_{adv}$, a cyclic loss function $L'_{cyc}$, and an identity loss function $L'_{id}$ as objective functions L was performed. In the first experiments, an experiment (hereinafter referred to as a (1-2)th experiment") of learning the voice signal conversion model using an adversarial loss function $L_{t\text{-}adv}$, the cyclic loss function $L'_{cyc}$, and the identity loss function $L'_{id}$ as objective functions L was performed. In the first experiments, an experiment (hereinafter referred to as a (1-3)th experiment") of learning the voice signal conversion model using the speaker identification loss function $L_{cls}$, the adversarial loss function $L_{t\text{-}adv}$, the cyclic loss function $L'_{cyc}$, and the identity loss function $L'_{id}$ as objective functions L was performed. In the first experiments, an experiment (hereinafter referred to as a (1-4)th experiment") of learning the voice signal conversion model using the function represented by formula (1) as an objective function L was performed. In the first experiments, $\lambda_{cyc}$ was 10 and $\lambda_{id}$ was 1.

The speaker identification loss function $L_{cls}$ is represented by the sum of formula (6) and formula (7) below, the adversarial loss function $L_{adv}$ is represented by formula (8) below, the adversarial loss function $L_{t\text{-}adv}$ is represented by formula (9) below, the cyclic loss function $L'_{cyc}$ is represented by formula (10), and the identity loss function $L'_{id}$ is represented by formula (11).

[Math. 6]

$$L_{cls}^{r}=\mathbb{E}_{(x,c_1)\sim P(x,c_1)}[-\log C(c_1|x)] \tag{6}$$

[Math. 7]

$$L_{cls}^{f}=\mathbb{E}_{x\sim P(x),c_2\sim P(c_2)}[-\log C(c_2|G(x,c_2))] \tag{7}$$

[Math. 8]

$$L_{adv}=\mathbb{E}_{x\sim P(x)}[\log D(x)]+\mathbb{E}_{(x,c_2)\sim P(x,c_2)}[\log(1-D(G(x,c_2)))] \tag{8}$$

[Math. 9]

$$L_{t\_adv}=\mathbb{E}_{(x,c_1)\sim P(x,c_1)}[\log D(x,c_1)]+\mathbb{E}_{(x,c_2)\sim P(x,c_2)}[\log(1-D(G(x,c_2),c_2)))] \tag{9}$$

[Math. 10]

$$L'_{cyc}=\mathbb{E}_{(x,c_1)\sim P(x,c_1),c_2\sim P(c_2)}[\|x-G(G(x,c_2),c_1)\|_1] \tag{10}$$

[Math. 11]

$$L'_{id}=\mathbb{E}_{(x,c_1)\sim P(x,c_1)}[\|G(x,c_1)-x\|_1] \tag{11}$$

In addition, x and $c_1$ of the right side of formula (6) represent $S'_0$ and $C'_1$ of the second learning data in order. In addition, x and $c_2$ of the right side of formula (7) represent $S_0$ and $C_2$ of the first learning data in order. Further, x of the first term of the right side of formula (8) represents $S'_0$ of the second learning data. Further, x and $c_2$ of the second team of the right side of formula (8) represent $S_0$ and $C_2$ of the first learning data in order. In addition, x and $c_1$ of the first term of the right side of formula (9) represent $S'_0$ and $C'_1$ of the second learning data in this order. Further, x and $c_2$ of the second term of the right side of formula (9) represent $S_0$ and $C_2$ of the first learning data in order. In addition, x, $c_1$ and $c_2$ of the right side of formula (10) represent $S_0$, $C_1$ and $C_2$ of the first learning data in order. Further, x and $c_1$ of the right side of formula (11) represent $S_0$ and $C_1$ of the first learning data in order.

FIG. 14 shows that the experimental results of the (1-4)th experiment are the smallest MCD and the smallest MSD. This indicates that the learned voice signal conversion model obtained by learning using the objective function L represented by formula (1) is capable of converting into a voice signal representing a voice closer to a voice of a speaker indicated by conversion destination speaker information than the learned voice signal conversion model obtained by the other learning in FIG. 14. In FIG. 14, "$L_{cls}$" represents the (1-1)th experiment, "$L_{t\text{-}adv}$" represents the (1-2)th experiment, "$L_{t\text{-}adv}$+$L_{cls}$ (StarGAN-VC)" represents the (1-3)th experiment, and "$L_{st\text{-}adv}$ (StarGAN-VC2)" represents the (1-4)th experiment.

FIG. 15 is a diagram of results of experiments (hereinafter referred to as "second experiments") showing differences in MCD and differences in MSD due to differences in the functional configuration of the generation unit 110 used for learning a voice signal conversion model.

In FIG. 15, "Channel-wise (StarGAN-VC)" is a technique of performing convolution including conversion destination speaker information at the time of executing convolution processing by the encoder 111. That is, the results of the row of "Channel-wise (StarGAN-VC)" represent MSD and MCD of a learned voice signal conversion model obtained by learning of performing convolution including conversion destination speaker information at the time of executing convolution processing by the encoder 111.

In FIG. 15, "Modulation-based (StarGAN-VC2)" is a technique of encoding the first learning data by processing shown in FIG. 13. That is, the results of the row of "Modulation-based (StarGAN-VC2)" represent MSD and MCD of a learned voice signal conversion model obtained by learning using the generation unit 110 of the second modified example.

FIG. 15 shows that values of MCD are substantially the same in "Channel-wise (StarGAN-VC)" and "Modulation-based (StarGAN-VC2)." FIG. 15 shows that the value of MSD of "Modulation-based (StarGAN-VC2)" is smaller than the value of MSD of "Channel-wise (StarGAN-VC)." Therefore, FIG. 15 shows that the learned voice signal conversion model obtained by learning of "Modulation-based (StarGAN-VC2)" is capable of converting into a voice signal representing a voice closer to a voice of a speaker indicated by conversion destination speaker information than the learned voice signal conversion model obtained by learning of "Channel-wise (StarGAN-VC)."

Figure 16:
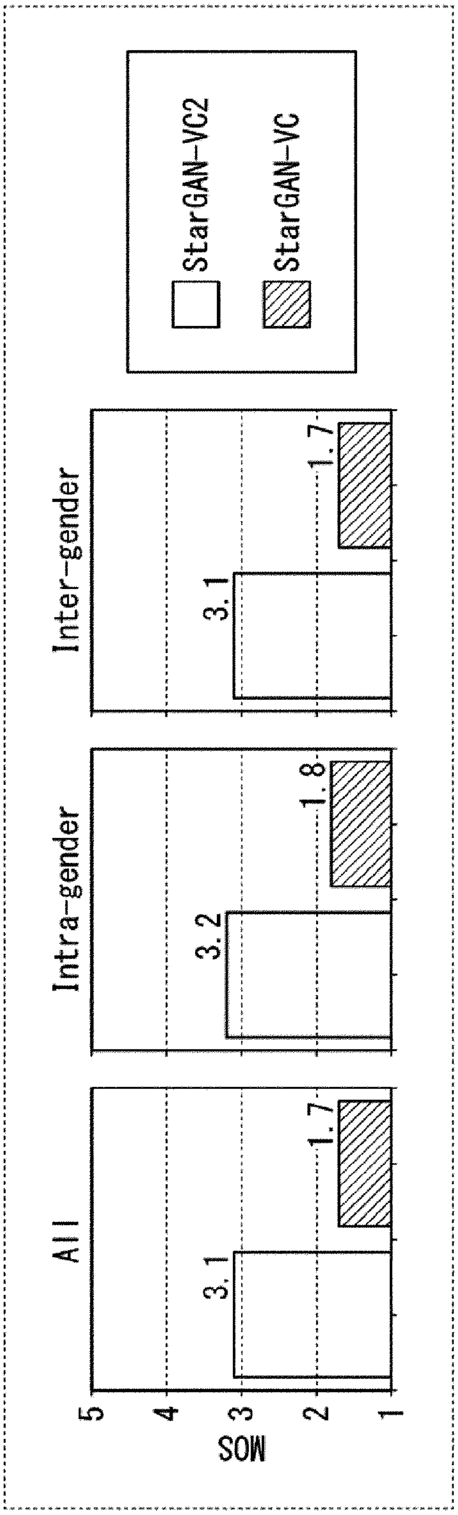
FIG. 16 is a diagram of results of an experiment showing MOS due to differences in a combination of an objective function and the functional configuration of the generation unit 110.

FIG. 16 is a diagram of results of experiments (hereinafter referred to as "third experiments") showing a mean opinion score (MOS) due to differences in a combination of an objective function used for learning a voice signal conversion model and the function configuration of the generation unit 110. The MOS has a maximum evaluation of 5 and a minimum evaluation of 1.

In FIG. 16, "StarGAN-VC2" represents a learned voice signal conversion model obtained by the voice signal conversion model learning device 1 in which the objective function is represented by formula (1) and the generation unit 110 serves as a functional unit that encodes the first learning data through processing shown in FIG. 13.

In FIG. 16, "StarGAN-VC" represents a learned voice signal conversion model obtained by a comparison target device. The comparison target device is different from the voice signal conversion model learning device 1 in that objective functions are represented by formula (6), formula (7), formula (8), and a linear sum of formula (10) and formula (11), and the generation unit 110 performs convolution including conversion destination speaker information at the time of executing convolution processing by the encoder 111.

In FIG. 16, "Inter gender" indicates a MOS for conversion of a voice signal between different genders by the learned voice signal conversion model. In FIG. 16, "Intra gender" indicates a MOS for conversion of a voice signal between the same genders by the learned voice signal conversion model. In FIG. 16, "Ail" is the sum of results of "Inter gender" and "Intra gender."

FIG. 16 shows that a voice signal obtained by "StarGAN-VC2" has a higher MOS than a voice signal obtained by "StarGAN-VC" in all of "Inter gender," "Intra gender" and "All."

Figure 17:
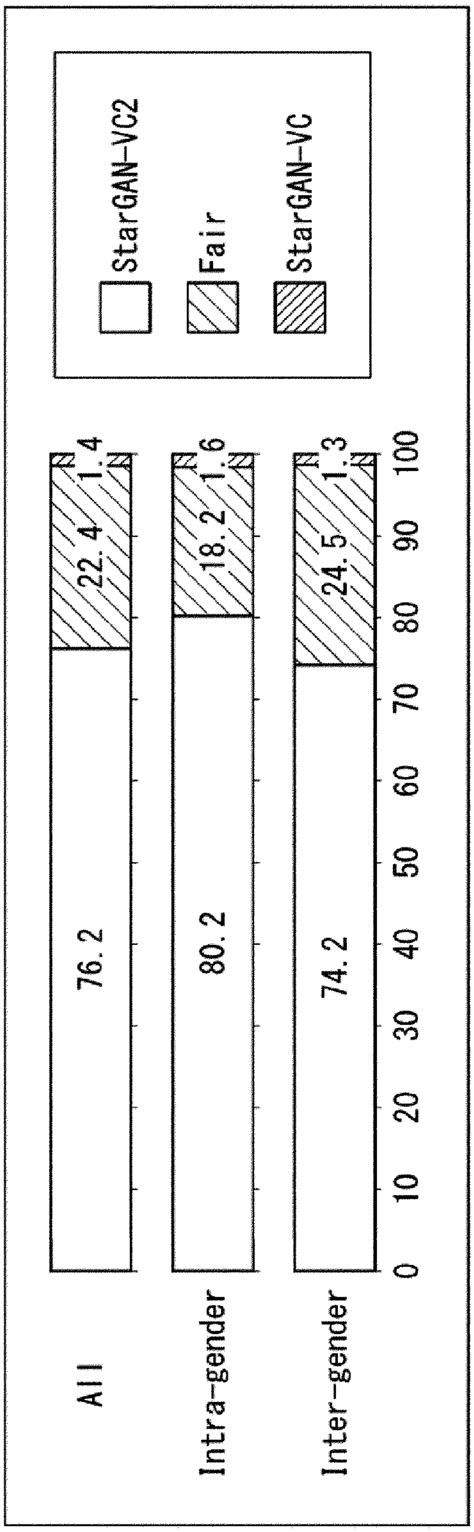
FIG. 17 is a diagram of results of an experiment showing average preference scores on speaker similarity due to differences in the combination of the objective function and the functional configuration of the generation unit 110.

FIG. 17 is a diagram of results of experiments (hereinafter referred to as "fourth experiments") showing average preference scores on speaker similarity due to differences in a combination of an objective function used for learning a voice signal conversion model and the function configuration of the generation unit 110. The average preference scores on speaker similarity are an experiment in which a subject determines whether a voice generated by a learned voice signal conversion model is similar to an actual voice of a speaker that is a voice signal conversion destination, or not.

In FIG. 17, "Fair" indicates that the generated voice is not similar to the actual voice. FIG. 17 shows that a voice of a voice signal obtained by "StarGAN-VC2" is closer to a voice of a speaker that is a conversion destination in all of "Inter gender," "Intra gender" and "All."

Fourth Modified Example

The identification unit 120 may further execute speaker identification processing. Speaker identification processing is executed when the second learning data is input to the identification unit 120. Speaker identification processing estimates a speaker with respect to a second learning voice signal $S'_0$ of the input second learning data. Specifically, speaker identification processing is executed by a neural network for executing speaker identification processing. The neural network for executing speaker identification processing is updated on the basis of the value of formula (6) or formula (7) acquired by the loss acquisition unit 140. More specifically, the neural network for executing speaker identification processing is updated such that the value of formula (6) decreases on the basis of the value of formula (6) acquired by the loss acquisition unit 140 when the second learning data is input to the identification unit 120. In addition, when the first learning data is input to the generation unit 110, the neural network for executing speaker identification processing is updated such that the value of formula (7) decreases on the basis of the value of formula (7) acquired by the loss acquisition unit 140. Further, when the first learning data is input to the generation unit 110, the generation unit 110 performs learning such that the value of formula (7) decreases on the basis of the value of formula (7) acquired by the loss acquisition unit 140. The function represented by C in formula (6) indicates speaker identification processing. Further, when speaker identification processing is executed, the identification unit 120 may use or may not use either or both of conversion source speaker information and conversion destination speaker information. When either or both of the conversion source speaker information and the conversion destination speaker information are not used, the identification unit 120 estimates whether or not a voice signal represented by identification input data is a voice signal representing an actually uttered vocal sound without using either or both of the conversion source speaker information and the conversion destination speaker information.

Fifth Modified Example

The second modified example described that conversion source speaker information is not necessarily used for the generation unit 110. When the generation unit 110 does not use conversion source speaker information, the identification unit 120 may use or may not use the conversion source speaker information. When the conversion source speaker information is not used, the identification unit 120 estimates whether or not a voice signal represented by identification input data is a voice signal representing an actually uttered vocal sound without using the conversion source speaker information.

Sixth Modified Example

The processing executed in the second characteristic extraction processing is not necessarily convolution processing. The processing executed in the second characteristic extraction processing may be any processing as long as it is processing performed by a neural network, for example, a recurrent neural network or a fully connected neural network. The second characteristic extraction processing is an example of characteristic processing.

Seventh Modified Example

The first type data generation processing is an example of generation processing. The first learning data is an example of an input voice signal. The first type generation data is an example of a conversion destination voice signal. The natural voice estimation processing is an example of voice estimation process. The speaker estimation processing is an example of attribute estimation processing. The first type generation voice is an example of a conversion destination voice. Further, the first learning voice is an example of an input voice.

The voice signal conversion model learning device 1 may be implemented using a plurality of information processing devices connected via a network so as to be capable of communication. In this case, respective functional units included in the voice signal conversion model learning device 1 may be implemented in a distributed manner across the plurality of information processing devices.

The voice signal conversion device 2 may be implemented using a plurality of information processing devices connected via a network so as to be capable of communication. In this case, respective functional units included in the voice signal conversion device 2 may be implemented in a distributed manner across the plurality of intonation processing devices.

Some or all of the functions of the voice signal generation system 100 may be realized using hardware such as an application specific integrated circuit (ASIC), a programmable logic device (PLD), or a field programmable gate array (FPGA). A program may be recorded on a computer-readable recording medium. The computer-readable recording medium is, for example, a portable medium such as a flexible disk, a magneto-optical disk, a ROM, or a CD-ROM, or a storage device such as a hard disk built in a computer system. The program may be transmitted via an electric communication line.

Although the embodiments of the present invention have been described in detail with reference to the drawings, specific configurations are not limited to these embodiments, and designs and the like within a range that does not deviating from the gist of the present invention are also included.

REFERENCE SIGNS LIST

100 Voice signal generation system, 1 Voice signal conversion model learning device, 2 Voice signal conversion device, 10 Control unit, 11 Input unit, 12 Interface unit, 13 Storage unit, 14 Output unit, 101 Managed unit, 102 Management unit, 110 Generation unit, 120 Identification unit, 130 Determination unit, 140 Loss acquisition unit 20 Control unit, 21 Input unit, 22 Interface unit 23 Storage unit, 24 Output unit, 201 Conversion target acquisition unit, 202 Conversion unit, 203 Voice signal output control unit, 91 Processor, 92 Memory, 93 Processor, 94 Memory

The invention claimed is:

1. A voice signal conversion model learning device comprising:

a processor; and a storage medium having computer program instructions stored thereon, wherein the computer program instruction, when executed by the processor, perform processing of:

executing generation processing of generating a conversion destination voice signal on the basis of an input voice signal that is a voice signal of an input voice, conversion source attribute information that is information indicating an attribute of an input voice that is a voice represented by the input voice signal, and conversion destination attribute information indicating an attribute of a voice represented by the conversion destination voice signal that is a voice signal of a conversion destination of the input voice signal; and executing estimation processing of estimating whether or not a voice signal that is a processing target is a voice signal representing a vocal sound actually uttered by a person on the basis of the conversion source attribute information and the conversion destination attribute information, wherein the conversion destination voice signal is input to the processing of execution of generation processing, the processing target is a voice signal input to the processing of execution of generation processing, and the processing of execution of generation processing and the processing of execution of voice estimation processing are learned on the basis of an estimation result of the voice estimation processing.

2. The voice signal conversion model learning device according to claim 1, wherein the processing of execution of generation processing and the processing of execution of voice estimation processing are learned on the basis of the estimation result of the voice estimation processing, and a loss including a value indicating a difference between an attribute indicated by the processing target and information representing whether or not the processing target is a vocal sound actually uttered by a person.

3. The voice signal conversion model learning device according to claim 2, wherein the loss further includes a value indicating a difference between the conversion destination voice signal and a result of execution of generation processing on data for reverse generation that is data in which the conversion destination voice signal is an input voice signal, the conversion destination attribute information is conversion source attribute information, and the conversion source attribute information is conversion destination attribute information.

4. The voice signal conversion model learning device according to claim 2, wherein the loss further includes a value of a function of restricting the input voice and the voice represented by the conversion destination voice such that the two voices become identical when an attribute indicated by the conversion source attribute information and an attribute indicated by the conversion destination attribute information are identical.

5. A voice signal conversion device comprising:

acquiring a conversion target voice signal that is a voice signal corresponding to a conversion target; and converting the conversion target voice signal using a model of machine learning for converting the conversion target voice signal obtained by a voice signal conversion model learning device comprising: a processor; and a storage medium having computer program instructions stored thereon, wherein the computer program instruction, when executed by the processor, perform processing of: executing generation processing of generating a conversion destination voice signal on the basis of an input voice signal that is a voice signal of an input voice, conversion source attribute information that is information indicating an attribute of an input voice that is a voice represented by the input voice signal, and conversion destination attribute information indicating an attribute of a voice represented by the conversion destination voice signal that is a voice signal of a conversion destination of the input voice signal; and executing voice estimation processing of estimating whether or not a voice signal that is a processing target is a voice signal representing a vocal sound actually uttered by a person on the basis of the conversion source attribute information and the conversion destination attribute information, wherein the conversion destination voice signal is input to the processing of execution of generation processing, the processing target is a voice signal input to the processing of execution of generation processing, and the processing of execution of generation processing and the processing of execution of voice estimation processing are learned on the basis of an estimation result of the voice estimation processing.

6. A voice signal conversion model learning method executed by a voice signal conversion model learning device comprising: a processor; and a storage medium having computer program instructions stored thereon, wherein the computer program instruction, when executed by the processor, perform processing of: executing generation processing of generating a conversion destination voice signal on the basis of an input voice signal that ia a voice signal of an input voice, conversion source attribute information that is information indicating an attribute of an input voice that is a voice represented by the input voice signal, and conversion destination attribute information indicating an attribute of a voice represented by the conversion destination voice signal that is a voice signal of a conversion destination of the input voice signal; and executing voice estimation processing of estimating whether or not a voice signal that is a processing target is a voice signal representing a vocal sound actually uttered by a person on the basis of the conversion source attribute information and the conversion destination attribute information, wherein the conversion destination voice signal is input to the processing of execution of generation processing, the processing target is a voice signal input to the processing of execution of generation processing, and the processing of execution of generation processing and the processing of execution of voice estimation processing are learned on the basis of an estimation result of the voice estimation processing, the voice signal conversion model learning method comprising:

executing generation processing of generating a conversion destination voice signal on the basis of an input voice signal that is a voice signal of an input voice, conversion source attribute information that is information indicating an attribute of an input voice that is a voice represented by the input voice signal, and conversion destination attribute information indicating an attribute of a voice represented by the conversion destination voice signal that is a voice signal of a conversion destination of the input voice signal;

executing voice estimation processing of estimating whether or not a voice signal that is a processing target is a voice signal representing a vocal sound actually uttered by a person on the basis of the conversion source attribute information and the conversion destination attribute information; and performing by the processing of execution of generation processing and the processing of execution of voice estimation processing, learning on the basis of an estimation result of the voice estimation processing.

7. A non-transitory computer readable medium which stores a program for causing a computer to function as the voice signal conversion model learning device according to claim 1.

* * * * *